United States Patent Office 3,415,059
Patented Dec. 10, 1968

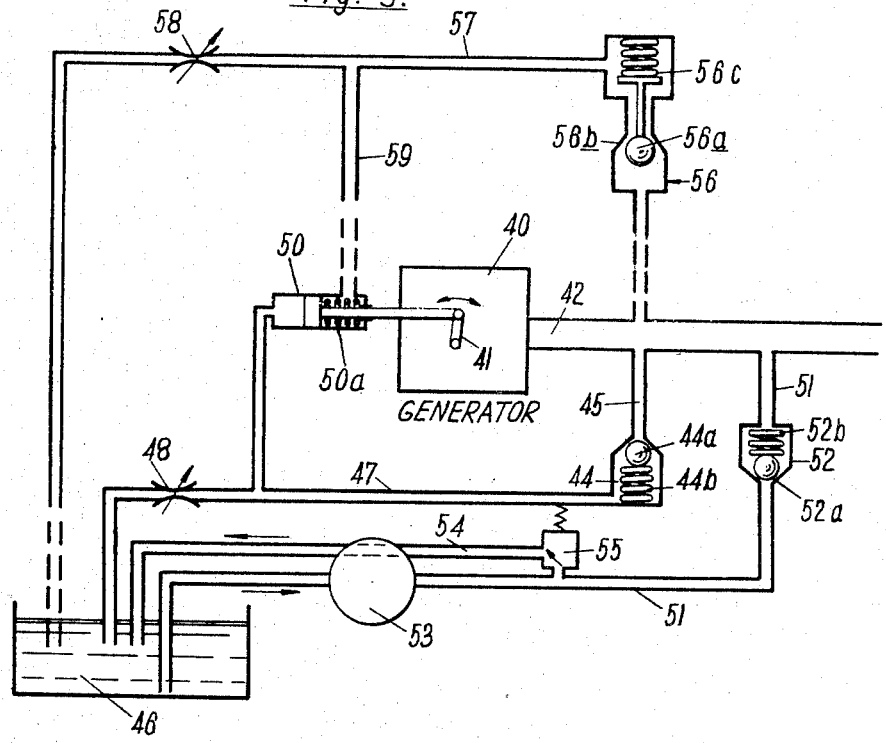
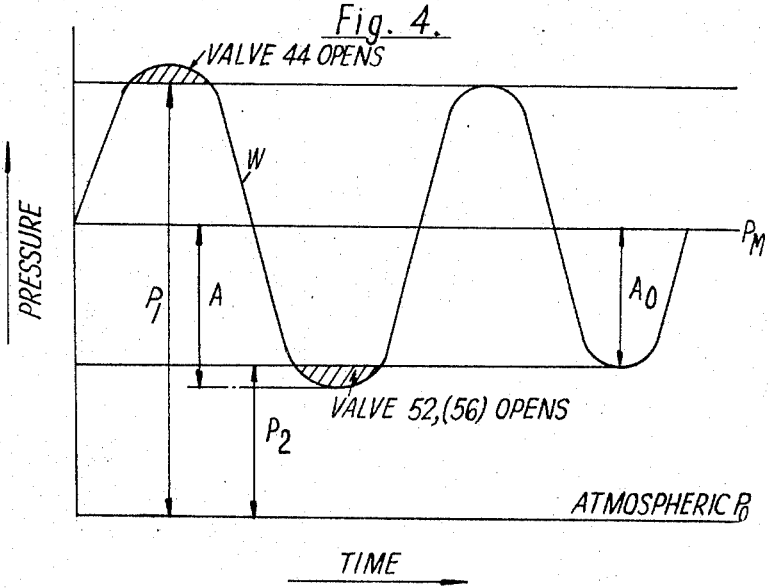

3,415,059
APPARATUS FOR GENERATING
FLUID PULSES
Keith Foster, Birmingham, England, and Donald Firth, East Kilbride, near Glasgow, Scotland, assignors to National Research Development Corporation, London, England
Filed Nov. 1, 1965, Ser. No. 511,584
Claims priority, application Great Britain, Nov. 2, 1964, 44,656/64
10 Claims. (Cl. 60—54.6)

ABSTRACT OF THE DISCLOSURE

Fluid pulse generating apparatus comprising first and second fluid pulse generators communicating with a common fluid passage to produce fluid pulses therein with zero net flow in the passage, and means for changing the phase of the second generator relative to the first to permit adjustment of the resultant pulse amplitude in the passage.

The present invention relates to an apparatus for generating fluid pulses, that is, an apparatus by which pressure pulses are generated in a fluid under conditions of substantially no mean fluid flow.

According to the present invention in another aspect, there is provided fluid pulse generating apparatus comprising first and second fluid pulse generators, a common fluid passage which communicates with said generators so as to receive fluid pulses therefrom, and means for changing the phase of the second fluid pulse generator relative to the first whereby the resultant pulse amplitude in the said fluid passage may be adjusted between a maximum and a minimum value, the said first and second fluid pulse generators comprising respective first and second stator assemblies, a plurality of chambers in each said stator assembly, each chamber permanently communicating with said common fluid passage and a rotor assembly common to both said stator assemblies and adapted, on rotation relative thereto, to produce fluid pulses in the chambers of the respective stator assemblies, the fluid pulses in the chambers of the respective stator being in phase with each other, the relative rotation producing substantially zero mean flow in the said common fluid passage.

The resultant pulse amplitude is a maximum when the two pulse generators are in phase with each other, while, when the pulse generators are in antiphase, the resultant pulse amplitude is a minimum, and substantially zero.

The said means for changing the relative phase of the fluid pulse generators may comprise means for adjusting the angular position of the second stator assembly relative to the first stator assembly.

According to a preferred embodiment of the invention, means sensing the said resultant pulse amplitude is connected to said common fluid passage and is adapted to control the said means for changing the relative phase of the said pulse generators whereby, when the said pulse amplitude differs from a desired value, the said phase changing means is actuated in such a way as to return the said pulse amplitude to the said desired value.

The said common fluid passage may alternatively, or in addition, communicate with a backing pump through valve means whereby, when the minimum pressure in the said passage falls below a predetermined value, the said valve means open momentarily to permit some fluid flow into said passage from said backing pump.

By this means the resultant fluid pulse amplitude in the said common fluid passage may be automatically regulated so as not to exceed a predetermined value.

According to a further aspect of the invention, the first and second stators may each comprise a cylinder block, a common fluid passage in said block, a plurality of radially extending cylinders communicating with said passage and respective plunger members movable radially in respective cylinders, the common rotor assembly having first and second outer coaxially disposed cam members respectively engaging said plunger members of the first and second cylinder blocks, said cam members and the cylinder blocks being relatively rotatable the arrangement and shape of said cam members being such that the movements of said plunger members of each cylinder block in their respective cylinders are substantially in phase with each other, and means for adjusting the angular position of the second cylinder block relative to the first cylinder block. Thus the cam member may be provided with a number of lobes or projections equal to the number of cylinders in the cylinder block.

It is also preferably arranged, by suitably shaping the cam member, that the motion of the plunger members in their respective cylinders is simple harmonic motion, so that the resultant pressure fluid oscillations are sinusoidal.

Preferably the said plunger members are spherical members which are adapted to roll on the surface of the cam member on relative rotation of the latter and the cylinder block.

According to a preferred embodiment of the invention the cam member is mounted for rotation relative to the cylinder block on bearings and lubricating passages are provided for conducting leakage flow of fluid past said plunger members to said bearings for lubrication thereof.

The invention will now be described, merely by way of example, with reference to the accompanying drawings, in which:

FIGURE 3 is a control circuit included in one embodiment of apparatus according to the invention; and FIGURE 4 is a graphical representation of the fluid pulse output of the apparatus shown in FIGURE 3.

Figure 1:
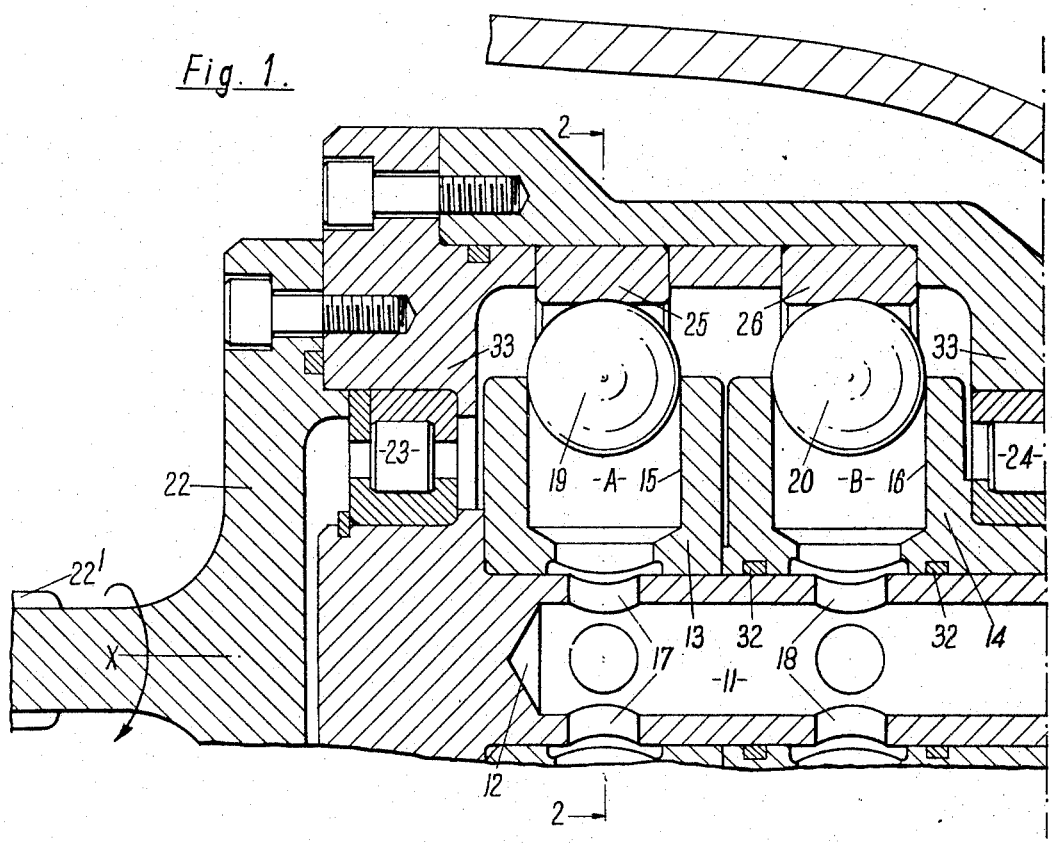
FIGURE 1 is an axial section through fluid pulse generating apparatus according to one embodiment of the invention.
Figure 1A:
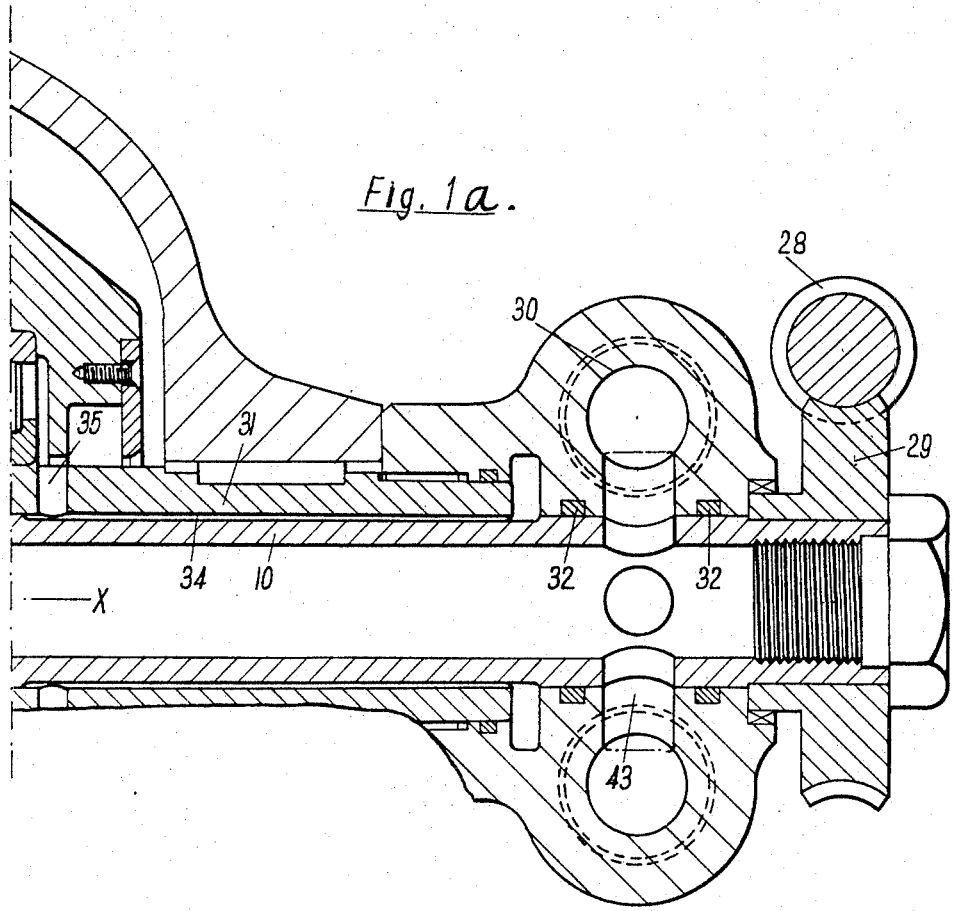
Figure 2:
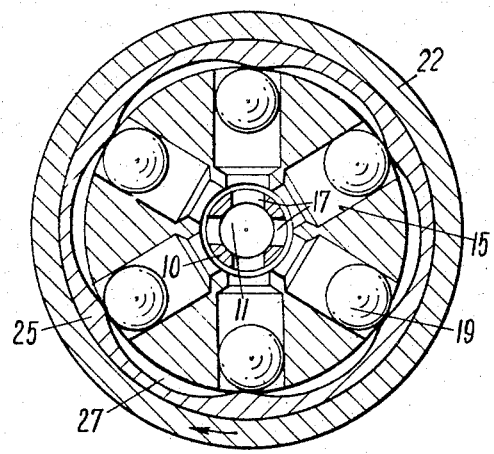
FIGURE 2 is a cross-sectional view of the apparatus of FIGURE 1, taken along the line 2—2 of FIGURE 1.

Referring to FIGURES 1 and 2 it will be understood that the axial section of FIGURE 1 shows one half only of the apparatus, the axis X—X being an axis of symmetry.

The fluid pulse generating apparatus has a central stationary tubular member 10 within which an axially extending fluid passage 11 is formed. The fluid passage has a closed end 12 adjacent which first and second axially spaced stator assemblies 13, 14 respectively are disposed. The stator assemblies 13, 14 are respectively parts of first and second fluid pulse generators, indicated generally by A and B respectively in FIGURE 1.

The first and second stator assemblies 13, 14 are each provided with a plurality (in this example, six) of radially extending cylinders 15, 16 respectively. The radially inner ends of each of the cylinders 15, 16 communicate with the axial passage 11 through respective holes 17, 18 in the tubular member 10. Spherical plunger members 19, 20 are mounted in each of the respective cylinders 15, 16 for substantially fluid-tight movement therein.

A common rotor assembly 22 is disposed coaxially about the first and second stator assemblies 15, 16, and is mounted for rotation relative thereto on roller bearings 23, 24 provided on the tubular member 10 and the second stator assembly 14 respectively. First and second cam tracks 25, 26 are provided on the internal surface of the rotor assembly 22 and are in continuous contact with the spherical plunger members 19, 20 respectively. Each of the cam tracks 25, 26 is provided with a plurality (six in the example illustrated) of equiangularly spaced lobes 27 (FIGURE 2).

The first stator assembly 13 is fixed relative to the central tubular member 10; the second stator assembly, however, is mounted for angular movement about the tubular member 10, that is, it may be moved angularly relative to the first stator assembly. Angular movement of the second stator assembly 14 is achieved by a worm 28 which meshes with a worm wheel 29. The worm wheel 29 is geared to a sleeve member 30 rotatably mounted about the tubular member 10 and the sleeve member 30 is in turn splined to a tubular extension 31 of the second stator assembly 14. The second stator assembly 14 and the sleeve member 30 are sealed to the central tubular member 10 by means of sealing rings 32 made, for example, of "Teflon" (registered trademark).

The stator assemblies 13, 14 are spaced from the rotor assembly 22 by lubricating passages 33. Also, an annular duct 34 between the central tubular member 10 and the tubular extension 31 communicates with the roller bearing 24 via lubricating passages 35. It will readily be appreciated that any leakage flow of fluid past the spherical plunger members 19, 20 from the respective cylinders 15, 16 will be conducted through the lubricating passages 33, 35 to lubricate respectively the bearings 23, 24 and the annular space 34.

The operation of the fluid pulse generating means will be apparent from the drawings. The rotor assembly 22 is rotatably driven by, for example a diesel engine (not shown) through splines 22'. The passage 11 and the cylinders 15, 16 are filled with a hydraulic fluid under pressure on rotation relatively to the first and second stator assemblies 13, 14. The respective first and second cam tracks 25, 26 cause reciprocating motion of the respective spherical plunger members 19, 20 in their respective cylinders 15, 16, by virtue of the lobes 27, provided in the respective cam tracks 25, 26. Fluid pressure pulses are thereby induced in the hydraulic fluid in the passage 11, these pulses being transmitted through the fluid without any mean fluid flow taking place. In the embodiment illustrated, each spherical plunger member 19, 20 will perform six complete oscillations per revolution of the rotor assembly 22. Since there are six cylinders in each stator assembly the oscillations of the six plunger members 19, 20 in each respective generator A, B, will be in phase with each other, giving a resultant output from each generator A, B of six pulses per revolution.

Clearly the fluid pulses produced by the generators A, B will be in phase when the cylinders 15 of the generator first stator assembly 13 are exactly angularly aligned with the cylinders 16 of the second stator assembly 14. In this condition the resultant fluid pressure pulses in the common passage 11 will have maximum amplitude.

When, however, the angular relationship of the first and second stator assemblies is such that the fluid pulse outputs of the two pulse generators A, B are in antiphase, the resultant pulse amplitude in the common passage 11 will be a minimum. The minimum pulse amplitude will be substantially zero.

The shape of each lobe 27 in the cam tracks 25, 26 is such that, on uniform rotation of the rotor assembly 22 the plunger members 19, 20 are made to perform simple harmonic motion in their respective cylinders 15, 16. The resultant fluid pressure oscillations (FIGURE 4) in the fluid passage 11 are therefore sinusoidal.

The resultant fluid pulse amplitude in the passage 11 may be adjusted to have any value between the said maximum and minimum value by adjustment of the angular position of the second stator assembly 14 relative to the first stator assembly 13, using the worm 28.

Although the apparatus illustrated has a stationary central tubular member 10 the fluid pressure generating apparatus according to the invention could, alternatively have a rotary tubular member 10, in which case the functions of the stator assemblies 13, 14 and the rotor assembly 22 would be interchanged. It would be necessary, with such an arrangement, to conduct the fluid pressure pulses from the tubular member 10 to their point of use by means of a rotary valve or pintle.

FIGURE 3 shows one form of control circuit for fluid pulse generating apparatus 40 according to the invention. A control lever 41 is connected to the sleeve 30 of the apparatus. The angular position of the control lever 41 controls the relative angular positions of the first and second stator assemblies 13, 14 respectively, and, therefore, controls the resultant fluid pulse amplitude in the central fluid passage 11.

The central fluid passage 11 communicates with an output conduit 42, for example through passages 43 in the central tubular member 10 (FIGURE 2). The output conduit 42 extends to a point of use (not shown) which may be a fluid pulse transducer which is adapted to convert the fluid pulse energy into mechanical energy. Such a transducer could be rotary (that is, a motor) or reciprocating, for example a rock drill.

The output conduit 42 communicates with a first non-return valve 44 through a branch conduit 45. The valve 44 is in turn connected to a fluid reservoir 46 through a conduit 47 containing a variable restrictor 48. Upstream of the restrictor 48 the conduit 47 communicates with a ram 50 which controls the angular position of the control lever 41 and which urges the said lever 41 by a spring 50a in the direction of maximum pulse amplitude.

The output conduit 42 also communicates with a branch conduit 51 containing a second non-return valve 52. A backing pump 53 is connected to the branch conduit 51 on the other side of the non-return valve 52. The pump 53 is adapted to withdraw fluid from the reservoir 46 and pump it into the branch conduit 51. A return conduit 54 containing a control valve 55 connects the output side of the pump 53 to the reservoir 46.

The first non-return valve 44 contains a spring-urged valve member 44a which is urged on to its seat by an adjustable spring 44b. The valve 44 is arranged to open when the instantaneous fluid pressure in the output conduit 42 exceeds a predetermined value, determined by the setting of the valve spring 44b.

The second non-return valve 52 contains a valve member 52a which is urged on to its seat by a valve spring 52b. The valve 52 is so arranged that, when the instantaneous fluid pressure in the output conduit 42 falls below a predetermined value, the valve 52 opens, connecting the backing pump 53 to the conduit 42. The pressure at which the valve 52 is opened is determined by the setting of the valve spring 52b and by the output pressure of the backing pump 53, which is controlled by the control valve 55.

The control circuit of FIGURE 3 automatically controls the fluid pulse amplitude of the apparatus 40. When the pressure pulse amplitude in the conduit 42 exceeds a first predetermined pressure determined by the valve spring 42b, the first non-return valve is opened, remaining open only so long as the pressure in the conduit 42 exceeds said first predetermined pressure. This excess pressure thus communicates with the ram 50, which moves against the spring 50a to move the control lever 41 in such a direction as to reduce the pressure pulse amplitude.

When, on the other hand, the pressure in the conduit 42 falls below a second predetermined pressure maintained in the conduit 51 by the backing pump 53 the second non-return valve 52 is opened, causing the pressure in the conduit 42 to be maintained at the said second predetermined value. In this way, any loss of fluid from the conduit by leakage is continuously made good from the reservoir 46.

The resultant fluid pressure output in the conduit 42 is illustrated in FIGURE 4. The first predetermined pressure is indicated by $P_1$ and the second predetermined pressure by $P_2$. The output pressure pulses are indicated by a substantially sinusoidal wave W as a function of time. As explained above, when the pulse amplitude A is such that the maximum pressure exceeds $P_1$, the first non-return valve 44 is opened and the control lever 41 operated to reduce the amplitude. The pulse amplitude is therefore automatically regulated to a value $A_0$ given by:

$$2A_0 = P_1 - P_2$$

Fine control over the pressure pulse amplitude is achieved by means of the variable restrictor 48 which controls the pressure in the conduit 47 connecting the valve 44 to the ram 50.

A modification to the control circuit, which gives double-acting control of the ram 50, is shown connected to the control circuit of FIGURE 3 by broken-line conduits. This modification consists of a ball valve 56 communicating with the output conduit 42. The valve 56 has a ball 56a which is maintained on a valve seat 56b by fluid pressure in the conduit 42 acting against a biasing spring 56c.

When the minimum pressure in the conduit 42 falls below the second predetermined pressure $P_2$, the ball 56a is lifted off its seat 56b by the spring 56c, allowing fluid to flow through a conduit 57 to the reservoir 46 through a restrictor 58.

The conduit 58 communicates with the right hand side of the ram 50 through a conduit 59 upstream of the restrictor 58. When flow occurs through the restrictor 58, as described above, pressure in the conduit 59 rises, causing the ram 50 to move to the left, and increasing therefore the pressure pulse amplitude. Using this double-acting control system, the biassing spring 50a of the ram 50 may, of course, be dispensed with.

We claim:

1. Fluid pulse generating apparatus comprising first and second pulse generators each comprising respective first and second stator assemblies, a plurality of chambers in each stator assembly, pulsing means movable in each of said chambers to produce a fluid pulse therein, a rotor assembly common to said first and second stator assemblies and adapted, upon rotation relative thereto, to actuate said pulsing means to produce fluid pulses in all of the chambers of each stator assembly, the fluid pulses in all of the chambers of a given stator assembly being in phase with one another at all times, a common fluid passage which communicates with all of said chambers of said first and second stator assemblies to receive fluid pulses therefrom to produce a resultant pulse amplitude in said common fluid passage, said relative rotation producing zero mean flow in said common fluid passage, and means to change the phase of the pulses of the second pulse generator relative to the pulses of the first pulse generator to permit adjustment of the resultant pulse amplitude in said common fluid passage between a maximum and a minimum.

2. Apparatus as claimed in claim 1 wherein said means to changing the relative phase of the fluid pulse generators comprises means for adjusting the angular position of the second stator assembly relative to the first stator assembly.

3. Apparatus as claimed in claim 1 wherein means sensing the said resultant pulse amplitude is connected to said common fluid passage and is adapted to control the said means for changing the relative phase of the said pulse generators whereby, when the said pulse amplitude differs from a desired value, the said phase changing means is actuated in such a way as to return the said pulse amplitude to the said desired value.

4. Apparatus as claimed in claim 3 wherein the said phase changing means is resiliently urged towards a setting of maximum resultant amplitude, said sensing means sensing the maximum pressure in said passage and being adapted to move said phase changing means towards its minimum amplitude setting when said maximum pressure exceeds a predetermined value.

5. Apparatus as claimed in claim 1 wherein said common fluid passage communicates with a backing pump through valve means whereby, when the minimum pressure in said passage falls below a predetermined value, the said valve means open momentarily to permit some fluid flow into said passage from said backing pump.

6. Apparatus as claimed in claim 1 wherein the first and second stator assemblies each comprise a cylinder block, a plurality of radially extending cylinders in each cylinder block and respective plunger members movable radially in respective cylinders to produce said fluid pulse therein, and wherein said common fluid passage is in said blocks, the common rotor assembly having first and second outer coaxially disposed cam members respectively engaging said plunger members of the first and second cylinder blocks, said cam members and the cylinder blocks being relatively rotatable, the arrangement and shape of said cam members being such that the movements of said plunger members of each cylinder block in their respective cylinders are substantially in phase with each other, and further including means for adjusting the angular position of the second cylinder block relative to the first cylinder block.

7. Apparatus as claimed in claim 6 wherein each cam member is provided with a number of lobes equal in number to the number of cylinders in the respective cylinder block.

8. Apparatus as claimed in claim 6 wherein the shape of the cam members is such that the motion of the plunger members in their respective cylinders is simple harmonic motion and the resultant pressure fluid oscillations are sinusoidal.

9. Apparatus as claimed in claim 6 wherein said plunger members are spherical members which are adapted to roll on the surface of the cam member on relative rotation of the latter and the cylinder block.

10. Apparatus as claimed in claim 9 wherein each cam member is mounted for rotation relative to the respective cylinder block on bearings and lubricating passages are provided for conducting leakage flow of fluid past said plunger members to said bearings for lubrication thereof.

References Cited

UNITED STATES PATENTS

| 2,462,500 | 2/1949 | Hoffer | 103—161 |
| 2,762,305 | 9/1956 | Huber et al. | 103—11 |
| 2,882,831 | 4/1959 | Dannevig | 103—161 |
| 2,872,875 | 2/1959 | Mergen et al. | 103—161 |
| 2,953,096 | 9/1960 | Sampietro | 103—161 |
| 3,123,013 | 3/1964 | Ganahl | 103—161 |
| 1,764,712 | 6/1930 | Brackett et al. | 103—44 |

FOREIGN PATENTS

| 3,827 | 2/1914 | Great Britain. |
| 873,207 | 9/1953 | Germany. |
| 852,896 | 11/1960 | Great Britain. |

WILLIAM L. FREEH, *Primary Examiner.*

U.S. Cl. X.R.

103—37